United States Patent
Bordini

(10) Patent No.: US 7,234,562 B2
(45) Date of Patent: Jun. 26, 2007

(54) C-BEAM SUSPENSION SUPPORT

(75) Inventor: Giorgio Bordini, Tenerife Canarias (ES)

(73) Assignee: CNH America LLC, New Holland, PA (US)

( * ) Notice: Subject to any disclaimer, the term of this patent is extended or adjusted under 35 U.S.C. 154(b) by 194 days.

(21) Appl. No.: 11/156,687

(22) Filed: Jun. 20, 2005

(65) Prior Publication Data

US 2006/0027415 A1    Feb. 9, 2006

Related U.S. Application Data

(63) Continuation-in-part of application No. 10/911,888, filed on Aug. 5, 2004, now Pat. No. 7,204,340.

(51) Int. Cl.
*B60K 17/00* (2006.01)

(52) U.S. Cl. ........................ 180/356; 180/361

(58) Field of Classification Search ............ 180/342, 180/343, 348, 349, 353, 355, 356, 359, 360, 180/361, 253, 408, 363, 372; 280/6.154, 280/754

See application file for complete search history.

(56) References Cited

U.S. PATENT DOCUMENTS

| | | | | |
|---|---|---|---|---|
| 1,354,462 A | * | 10/1920 | Burrows | 180/356 |
| 1,373,142 A | * | 3/1921 | Midboe | 180/356 |
| 2,143,329 A | * | 1/1939 | Mohl | 180/361 |
| 2,806,713 A | * | 9/1957 | Muller | 280/124.111 |
| 4,860,843 A | * | 8/1989 | Baltensperger | 180/373 |

* cited by examiner

*Primary Examiner*—Paul N. Dickson
*Assistant Examiner*—Tiffany L. Webb
(74) *Attorney, Agent, or Firm*—Stephen A. Bucchianeri; John Williams Stader; Michael G. Harms

(57) ABSTRACT

An agricultural tractor rear suspension has a suspension arm pivotally coupled to the chassis of the tractor at a forward pivot joint. A guide roller and interengaged guide track are coupled to and between the chassis and the arm to prevent the arm from flexing laterally outward away from the chassis and flexing laterally inward toward the chassis, thus reducing stress on the pivot joint.

20 Claims, 7 Drawing Sheets

C-BEAM SUSPENSION SUPPORT

CROSS-REFERENCE TO RELATED APPLICATIONS

This application is a continuation-in-part of U.S. patent application Ser. No. 10/911,888, filed Aug. 5, 2004 now U.S. Pat. No. 7,204,340.

FIELD OF THE INVENTION

The present invention relates generally to suspensions. More particularly, it relates to tractor suspensions, and even more particularly to rear suspensions for agricultural tractors having pivotable suspension arms.

BACKGROUND OF THE INVENTION

Agricultural tractors have traditionally been unsprung. From their earliest beginnings in the late 1800's they have been supported on fixed axles extending from the chassis.

Originally, tractors were used as stationary engines. Located in a fixed position in a field, farmers would gather crops to be threshed and bring them in wagonloads to the tractor and a belt-driven threshing machine. In these early days, the ability to move fast was not important.

Tractors were gradually modified to tow implements such as plows, rakes, harrows, planters, and manure spreaders through agricultural fields. These mobile tractors did not need a great deal of speed since they replaced horses or oxen and needed only enough power to tow implements at horse or ox speed.

As time passed, engineers designed ever larger and stronger implements. To tow these implements, tractors were also made stronger and larger, with ten to fifty times the horsepower of the early tractors.

Eventually, agricultural tractors were capable of towing implements at higher speeds through agricultural fields. To accommodate these greater speeds, manufacturers began to develop front suspensions with springing and shock absorbing capability. These front suspensions were configured to pivot, permitting the front wheels of the tractor to keep a good grip on the ground as the terrain changed. As of today, however, no major manufacturer of tractors sells a commercially accepted agricultural tractor with a sprung rear suspension.

A primary reason that tractors with sprung rear suspensions have not been manufactured is due to the reaction forces that arise when a load is placed on the tractor. Traditional agricultural tractors have large rear wheels, typically on the order of approximately 1 to 2.2 meters in diameter. The large rear wheels apply high force to the ground, especially when a ground-engaging implement is ripping furrows through the ground 2 to 18 inches deep. The ground, in turn, applies an equally high (but in the opposite direction) reaction force on the frame of the tractor, and the reaction force can generate a moment great enough to literally lift the front wheels of a tractor without a rear suspension a meter or more off of the ground.

The existence of a moment large enough to lift the front wheels is best illustrated with reference to FIG. 9, which schematically shows a tractor 700 without a front or rear suspension towing an implement 148. An implement, resultant-force vector 402 is applied to the implement by the ground as the implement is pulled through the ground by the tractor 700. Implement force vector 402 can be broken down into two force vectors 404, 406 that represent the horizontal force (vector 404) acting to drag on the implement during forward motion, and the vertical force (vector 406) that pulls downward on the implement.

The implement is rigidly coupled to the tractor typically through a three-point hitch. The three-point hitch couples the implement to the tractor frame via a lower point A and an upper point B. The implement force vector 402 applies draft forces on the tractor that can be separated into horizontal and vertical forces $F_{Ax}$ and $F_{Ay}$ acting through the lower link 902 (i.e., at point A) and horizontal and vertical forces $F_{Bx}$ and $F_{By}$ acting through the upper link 904 (i.e., at point B). As one of ordinary skill will appreciate, the relative magnitudes of the component draft forces $F_{Ax}$, $F_{Ay}$, $F_{Bx}$ and $F_{By}$ depend upon the geometry of the three-point pitch.

Other forces acting on the tractor 700 include weight (depicted in the drawing as mg), which acts on the center of gravity $C_G$. In response to the weight, the ground applies forces $F_f$ and $F_r$ to the tractor through the front and rear axles, respectively.

There are torques shown in FIG. 9 as well. Drive torque $T_D$ is the torque applied by the engine (shown in FIG. 1) to the axle (also not shown) to drive the rear wheels. When the tractor is being driven forward, the drive torque is clockwise. The rear wheels, as they are being driven, apply a force on the ground, and the ground, in turn, applies an equal and opposite traction force $F_{Tr}$ on the wheels that is applied to the tractor frame. The traction force of course is responsible for forward movement of the tractor.

Drive torque $T_D$ also generates a reaction torque (that is, traction torque $T_{Tr}$) that acts on the frame of the tractor. The traction torque is proportional to the traction force $F_{Tr}$ and is counterclockwise.

The forces and torques generate moments about a point on the tractor that tend to rotate the tractor about that point. For convenience, the point will be called the center of pitch $C_p$. Its location depends upon a number of factors one of ordinary skill will appreciate. While the forces and torques may generate moments that cancel each other out to some extent, the net effect of all of the moments is to generate a counterclockwise moment $M_p$ about the center of pitch when the implement force vector 402 increases. The implement force vector increases when the implement 148 hits a stone, compacted soil, or some other such condition. As previously mentioned, the increased implement force vector can be large enough to cause a moment $M_p$ about the center of pitch that is itself large enough to lift the front tires and increase the load on the rear tires.

If the rear wheels were suspended on the frame rather than being fixed, the moment $M_p$ will not at first lift the front wheels, but it will tend to cause the rear suspension to squat. Such squatting can be disconcerting to the operator and can also wreak havoc on implement depth-control systems, which typically require a constant relationship between the tractor-frame and implement-frame heights.

One of ordinary skill will appreciate that some suspension configurations will cause the tractor to rotate clockwise (rather than counterclockwise, as has been described) when the tractor is subjected to increased loads. However, for the purposes of this discussion, we will consider the more intuitive case where the tractor rotates counterclockwise in response to increased loads. Nevertheless, the basic principles (and the problems with conventional systems) described herein are the same. Moreover, the principle of operation of the preferred embodiments (which will be described below) is the same regardless of whether the suspension tends to squat or sit up.

The suspension arrangement of the present invention generates a reaction torque on the vehicle to reduce the moment $M_p$ about the center of pitch. In other words, when the tractor pulls harder on its implement, the suspension in accordance with the present invention generates an increased counteracting, or reaction, force that matches or is proportional to the increased, horizontal force vector 404. Similarly, when the tractor pulls more gently on its implement, the suspension in accordance with the present invention generates a decreased force that matches the decreased horizontal force vector 404.

The applicant, in his co-pending patent application U.S. patent application Ser. No. 10/911,888, described a tractor that would solve many of these problems.

One problem that was not addressed by the tractor of that application was the rigidity of the rear suspension. The tractor shown in the prior application had suspension arms extending longitudinally toward the rear of the vehicle, but these suspension arms would flex unduly when the extreme torques generated by the engine were applied to the rear wheels.

The rear suspensions, as best shown in FIGS. 2-3 of that application, included a trailing link suspension arm pivotally coupled to the chassis of the tractor at its front and free to pivot up and down at its rear end. The rear of the suspension arms included a planetary gear system from which a laterally extending axle protrudes. The tractor's rear wheels are fixed to the ends of these axles. The axles extend a significant distance laterally away from the planetary gearbox, and the wheels are large diameter tractor wheels that extend a significant distance vertically from the axle to the ground. The distance between the tire/ground contact point and the pivot point of the suspension arm with respect to the chassis is typically 1-2 meters vertically, 0.5 to 2 meters horizontally and 1-1.5 meters longitudinally. This arrangement, which is the same as shown herein, applies considerable bending and twisting stresses on the suspension arm, particularly when a ground-engaging implement is fixed to the tractor.

What is needed, therefore, is a system that resists the twisting and bending forces applied to the suspension arm. What is also needed is a system that resists lateral inward and outward movement of the free end of the suspension arm. What is also needed is a system that will resist lateral deflection of the suspension arm and suspension arm movement of the free rear end of the suspension arm yet will also permit the suspension arm of the tractor to pivot up and down with respect to the chassis. It is an object of this invention to provide a tractor and tractor suspension that have these benefits.

SUMMARY OF THE INVENTION

In accordance with a first aspect of the invention, a tractor is provided, including a chassis comprising a front end, a rear end, a left side and a right side; a pair of steerable front wheels coupled to the front end, left and right side of the chassis; a left rear suspension including a left rear suspension arm pivotally coupled to the chassis at a left arm pivot point at the forward end of the left rear suspension arm; a right rear suspension including a right rear suspension arm pivotally coupled to the chassis at a right arm pivot point at the forward end of the right rear suspension arm; a first guide roller and an interengaged first guide track coupled to and between the left rear suspension arm and the chassis; and a second guide roller and an interengaged second guide track coupled to and between the right rear suspension arm and the chassis.

The left rear suspension arm and the right rear suspension arm may pivot with respect to the chassis about a first arm axis that extends laterally with respect to the chassis, and the first guide roller may rotate about a first roller rotary axis that is normal to and intersects the first arm axis, and the second guide roller may rotate about a second roller rotary axis that is normal to and intersects the first arm axis. The first guide roller may be disposed between a left side drive axle that extends from the rear of the right suspension arm and the left arm pivot point, to permit pivotal movement of the left arm about the left arm pivot point and to reduce flexure of the left arm in a direction parallel to the first arm axis, and the second guide roller may be disposed between a right side drive axle that extends from the rear of the right suspension arm and the right arm pivot point to permit pivotal movement of the right arm about the right arm pivot point, and to reduce flexure of the right arm in a direction parallel to the first arm axis. The first and second guide rollers may be fixed to opposite sides of the chassis of the vehicle and the first and second guide tracks may be fixed to the left and right suspension arms, respectively. The first and second guide tracks may each comprise an arcuate c-shaped beam having an internal roller channel with two opposed inner side walls that are disposed to guide the first and second guide rollers therebetween. The first and second guide rollers may be right circular cylinders and the first and second guide tracks may define in cross-section a rectangular channel with one open side.

In accordance with a second aspect of the invention, a tractor is provided, including a chassis comprising an elongate rigid member, the member comprised of an engine, a transmission and a rear differential, the chassis further having a front end and a rear end; a pair of steerable front wheels coupled to the front end, left and right side of the chassis; two rear suspensions fixed to opposite sides of the rear of the chassis, each suspension further including a rear suspension arm pivotally coupled to the rear of the chassis at a rear arm pivot point located at the forward end of the rear suspension arm; a first guide track coupled to one of the tractor chassis and the rear suspension arm; and a first guide roller coupled to another of the tractor chassis and the rear suspension arm, wherein the first guide roller is supported within the first guide track for rotation to prevent both lateral inward flexure and lateral outward flexure of the rear suspension arm.

The rear suspension arm may pivot with respect to the chassis about a first arm axis that extends laterally with respect to the chassis, and the first guide roller may rotate about a first roller rotary axis that is normal to and intersects the rear arm axis. The first guide roller may be disposed between a drive axle that extends from the rear of the rear suspension arm and the rear arm pivot point, to permit pivotal movement of the rear arm about the rear arm pivot point and to reduce flexure of the rear arm in a direction parallel to a rotational axis of the drive axle. The first guide roller may be fixed to opposite sides of the chassis of the vehicle and the first guide track is fixed to the rear suspension arm. The first guide track may include an arcuate c-shaped beam having an internal roller channel including two opposed inner side walls that are disposed to guide the first guide roller therebetween. The first guide roller may be a right circular cylinder and the first guide track is a rectangular channel with one open side. Each suspension may also include a planetary gearbox fixed to the rear arm; a drive axle extending from the gearbox; a second guide track coupled to one of the tractor chassis and the rear suspension arm; and a second guide roller coupled to another of the tractor chassis and the rear suspension arm, wherein the second guide roller is supported within the second guide track for rotation to prevent both lateral inward flexure and lateral outward flexure of the rear suspension arm. The first guide roller and first guide track may be disposed in front of the axle an the second guide roller and second guide track are disposed behind the axle.

In accordance with a third aspect of the invention, a tractor is provided, including a chassis comprising an elongate rigid member, the member comprised of an engine, a transmission and a rear differential, the chassis having a front end and a rear end; a pair of steerable front wheels coupled to the front end, left and right side of the chassis; two rear suspensions pivotally coupled to opposite sides of the rear of the chassis to pivot with respect thereto, each suspension including an elongated suspension arm having a front end and a rear end, wherein the front end is pivotally coupled to the chassis at a pivot point to pivot with respect to the chassis about a laterally extending pivotal axis; a planetary gearbox fixed to the suspension arm and having a drive axle extending laterally outward away from the chassis; and a guide assembly fixed to and between the suspension arm and the chassis to prevent lateral inward flexure and lateral outward flexure of the rear suspension arm and to permit the suspension arm to pivot about the pivotal axis with respect to the chassis, wherein the pivotal axes of the two rear suspensions are coaxial.

The guide assembly may include at least one guide roller supported against at least one guide track, where one of the guide roller and the guide track is fixed to the chassis and another of the guide roller and the guide track is fixed to the suspension arm. The guide roller may have a rotational axis that extends generally fore-and-aft with respect to the chassis. The guide roller rotational axis may intersect the pivotal axis. The guide track may have an arcuate c-shaped beam having an internal roller channel defined by two facing tracks for the guide roller. The two facing tracks may be selected from the group consisting of two parallel planes and portions of two conic sections.

Numerous other features and advantages of the present invention will become readily apparent from the following detailed description, the accompanying drawings, and the appended claims.

DETAILED DESCRIPTION OF THE PREFERRED EMBODIMENTS

Figure 1:
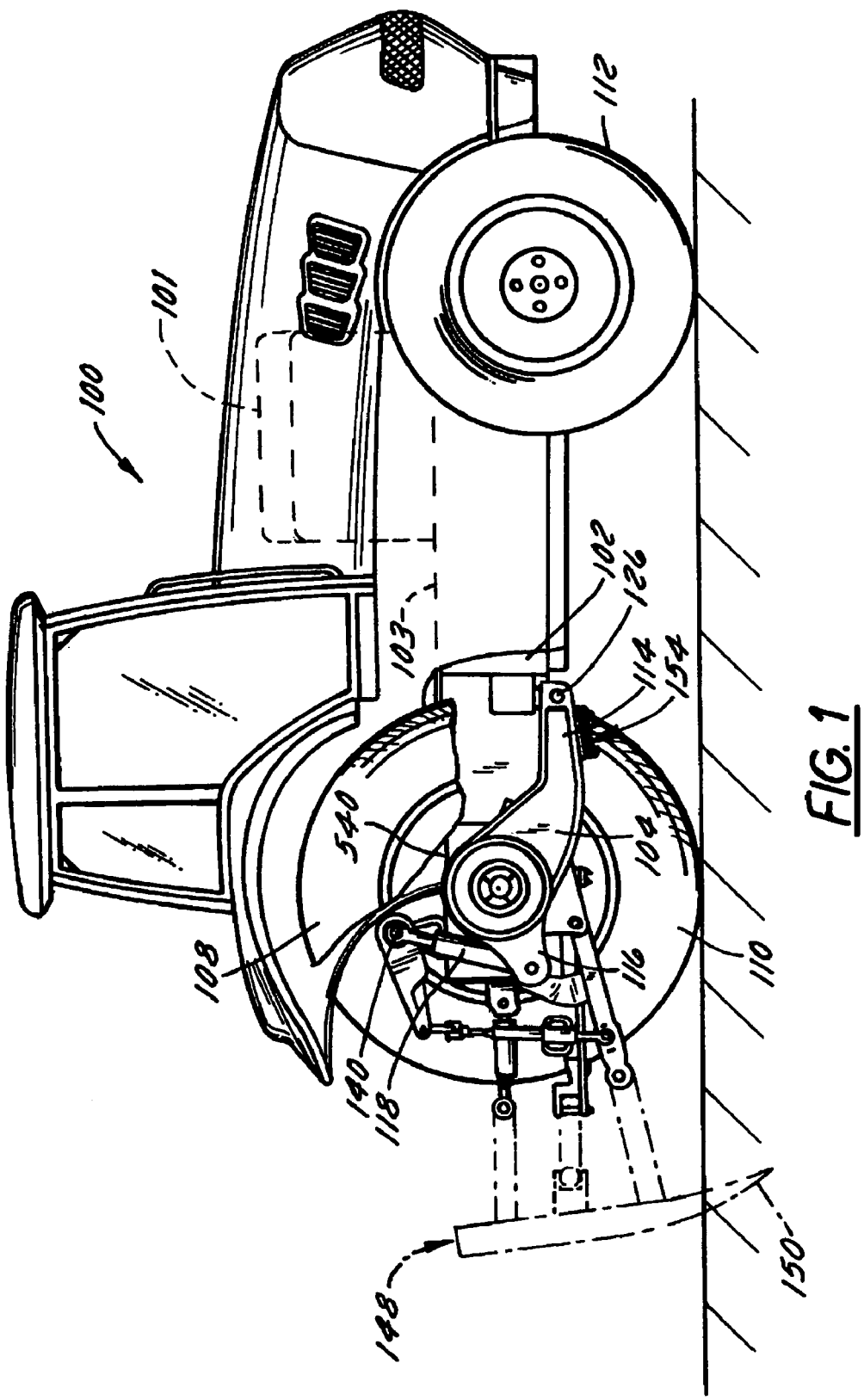
FIG. 1 is a side view of a tractor in accordance with the present invention.

While the present invention is susceptible of being made in any of several different forms, the drawings show a particularly preferred form of the invention. One should understand, however, that this is just one of many ways the invention can be made. Nor should any particular feature of the illustrated embodiment be considered a part of the invention, unless that feature is explicitly mentioned in the claims. In the drawings, like reference numerals refer to like parts throughout the several views.

Figure 2:
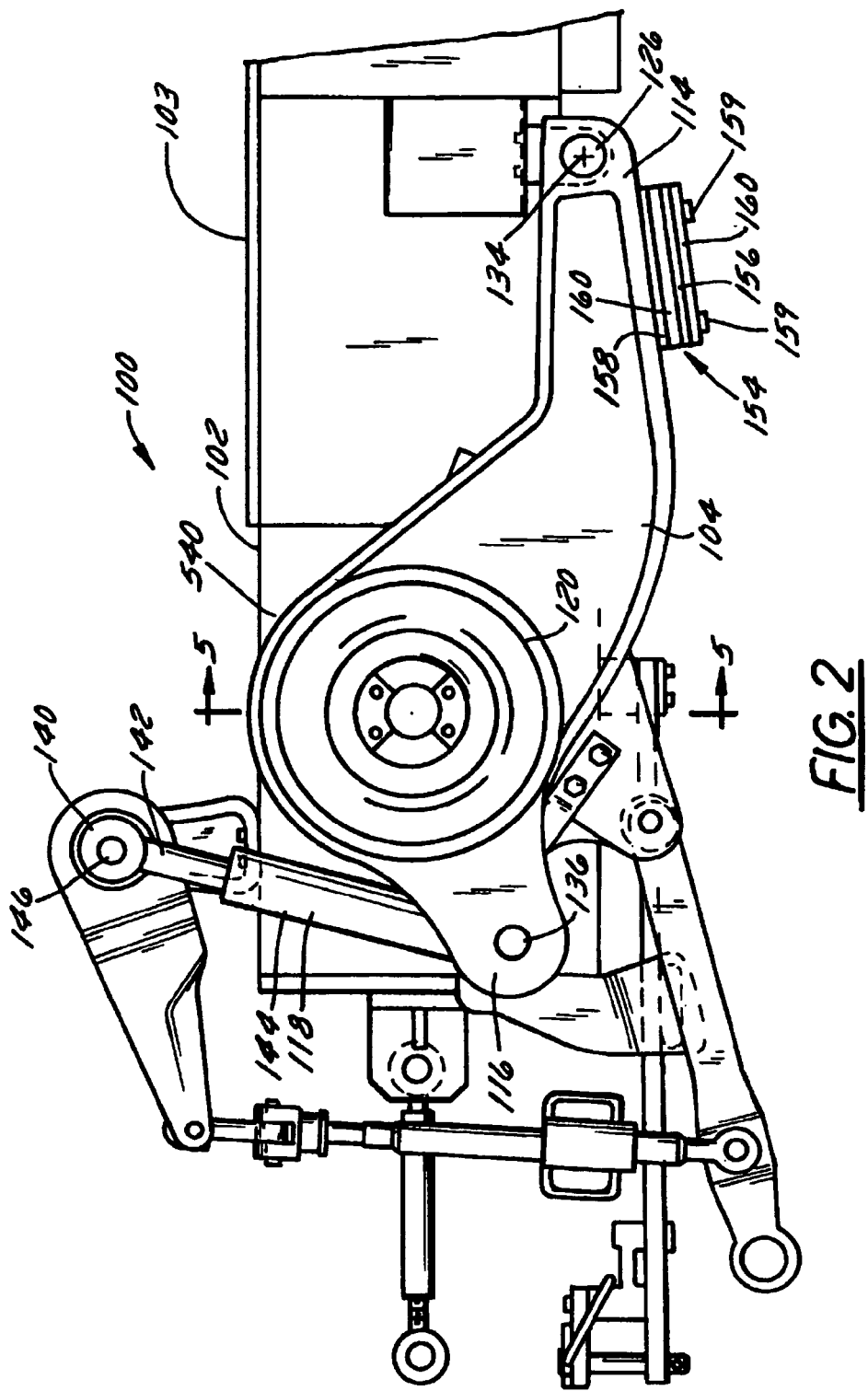
FIG. 2 is a fragmentary side view of the tractor of FIG. 1, showing the chassis and right rear suspension in greater detail.
Figure 3:
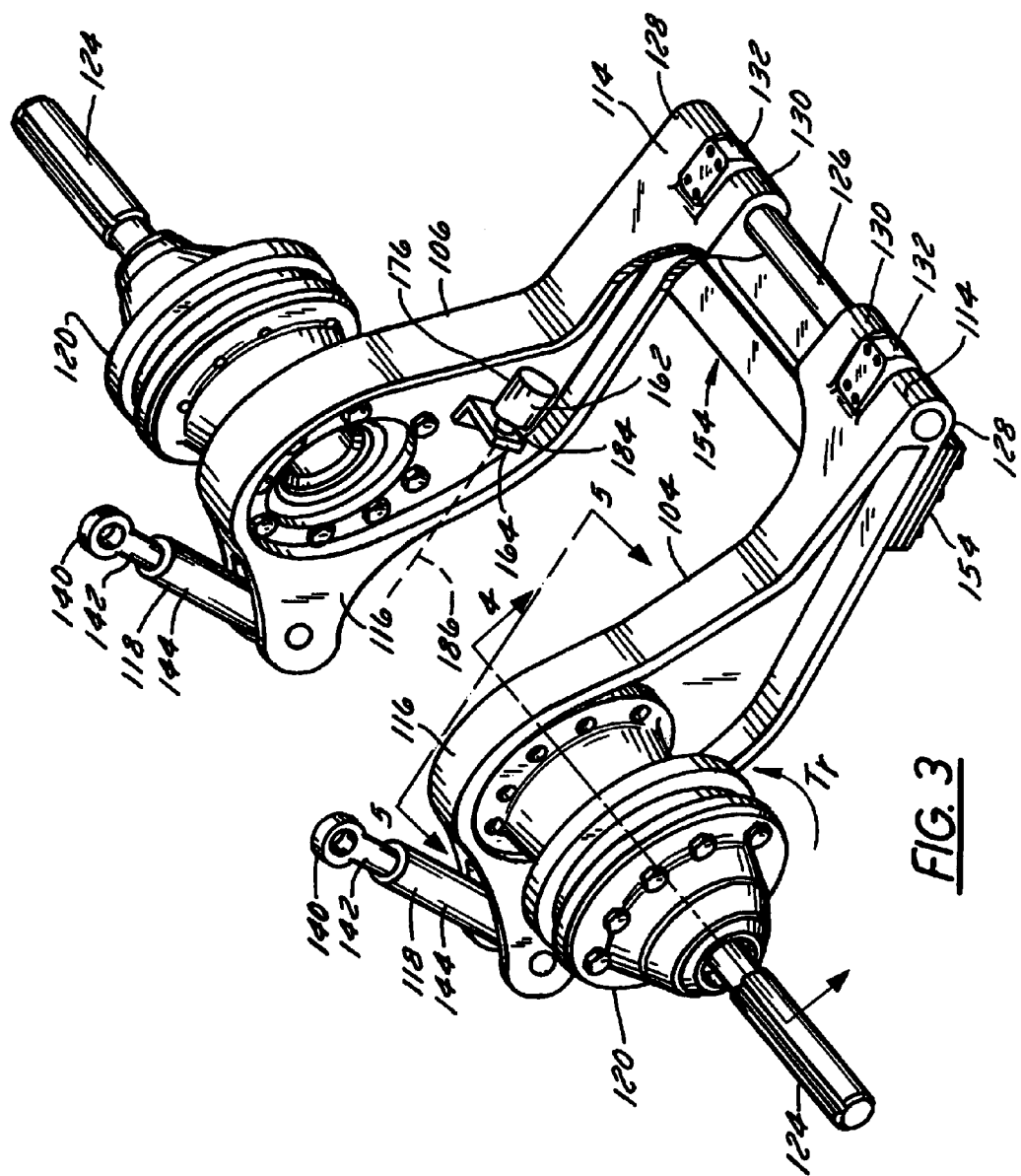
FIG. 3 is a perspective view of the left and right suspension arms, springs, anti-sway linkage and pivot pin of the tractor of the foregoing FIGURES.

FIGS. 1, 2 and 3 show a tractor 100 having a chassis 102 to which right and left suspension arms 104, 106 (FIG. 3) are coupled. The chassis is a rigid member formed of an engine 101, a transmission 103 and a differential including a housing 540 (FIG. 5) for housing the differential gears. The block of the engine 101, the transmission 103 and differential housing 540 are fixed together to form chassis 102 as a single elongated rigid member. Rear wheels 108, 110 are mounted to axles 124 extending from suspension arms 104, 106 and support the tractor for movement over the ground. The axles extend laterally, or side to side, with respect to the tractor. The wheels (including tires) preferably have a diameter of at least 1.5 meters, more preferably at least 2 meters, and even more preferably at least 2.5 meters. They may be fixed to axles 124 at several positions along the length of the axle including positions at least 0.25, 0.5, 1.0, and 1.5 meters or more away from the suspension arm. This is quite unlike automobiles or trucks, in which wheels of 0.3 meter diameter are mounted on axles that extend perhaps 0.2 meters from a suspension arm. Two steerable front wheels 112 (only one shown) are coupled to the front portion of the chassis on opposite sides of the front end to support the front of the vehicle.

Referring in particular to FIG. 3, each suspension arm 104,106 has a front end 114 and a rear end 116. The suspension arms are oriented generally fore-and-aft and extend longitudinally along the side of the tractor. The suspension arms are trailing links. The front end 114 is pivotally coupled to the chassis and the rear end 116 is supported by a spring 118. Spring 118 in the preferred embodiment shown here is a hydraulic cylinder that is coupled to a hydraulic circuit including valves and a gas-charged hydraulic accumulator (circuit not shown) to keep the spring 118 extended the appropriate amount.

Hydraulic cylinder 118 in the preferred embodiment shown here is coupled to a gas-charged hydraulic accumulator (not shown). As the tractor is loaded and unloaded, the hydraulic cylinders coupled to the accumulator (or accumulators) act as springs. When the load increases on the rear of the tractor, the suspension arms push upward on the cylinder portion of cylinders 118. This increases the hydraulic pressure in the cylinder and ejects hydraulic fluid into the gas-charged accumulator. This additional hydraulic fluid in the accumulator causes the pressure in the accumulator and the cylinder to increase until the cylinder pressure is just able to counteract the increased force acting on the swing arm.

When the load is decreased on the rear of the tractor, the reverse is true. Cylinders 118 gradually extend, pivoting the rear of suspension arms 104, 106 downward, permitting hydraulic fluid to escape the accumulator (or accumulators), and permitting the pressure inside the cylinders to decrease until it just balances the reduced load applied to suspension arms 104, 106.

Each suspension arm has an associated planetary gear system 120, which is fixed to the rear end 116 of each suspension arm 104, 106. The planetary gear system 120 supports the axle 124 that extends from the gear system. The left and right rear wheels 108, 110 are mounted to left and right axles 124.

The front end 114 of each suspension arm 104,106 is preferably coupled to chassis 102 by a pin 126. Pin 126 extends through an inner eye member 130 and an outer eye member 128 formed in the front end 114 of the suspension arm. Pin 126 also extends through an eye member 132 (FIG. 3) that is fixed to chassis 102 and fits between the inner and outer eye members 128, 130 on the suspension arms 104, 106. Pin 126, eye members 128, 130 and eye member 132 are closely toleranced, such that suspension arms 104, 106 are constrained by pin 126 to rotate about a laterally extending axis 134 best seen in FIG. 3. This arrangement also constrains the rear ends 116 of the two suspension arms to pivot about axis 134 and (in general) to move only up and down with respect to the chassis 102.

Referring to FIG. 2, each spring 118 is coupled at its lower end to its associated suspension arm by a pivot pin 136 that extends through the suspension arm and through an eye formed in the lower end of the spring 118. This arrangement permits the lower end of the spring 118 to pivot with respect to the suspension arm. A similar eye 140 is formed in the upper end of rod 142 extending from the hydraulic cylinder body 144 which is similarly pivotally coupled to a pin 146. Pin 146 is fixed to chassis 102 preferably via the tractor's rockshaft. However, the rod 142 may be coupled to the chassis at other locations.

The suspension arms pivot freely with respect to the chassis 102 with only two limits to their movement: the springs 118 and inter-arm, or anti-sway, link 154. As shown in FIG. 3, link 154 is coupled to and extends between both of the suspension arms 104,106. The anti-sway link 154 is essentially an anti-roll bar providing a passive, anti-roll function. The anti-sway link 154 can be used alone or in conjunction with other anti-roll features, such as active control of hydraulic springs 118. Such active anti-roll will be discussed in more detail below.

The anti-sway link 154 operates in the following way. When one wheel goes over a bump causing its suspension arm to pivot upward, the pivoting suspension arm flexes one end of link 154. The other end of link 154 is connected to the other suspension arm and reacts to this movement by attempting to pivot the other suspension arm upward to the same degree that the first suspension arm pivoted. The second suspension arm, however, is resting on ground (via the axle and wheel) at a slightly different height and is held against the ground by its own spring 118. Spring 118 of the second suspension arm resists the upward movement of the second suspension arm by link 154, preventing link 154 from moving the second suspension arm into a perfectly parallel relationship with the first suspension arm. As a result, both suspension arms do not move together to the same (i.e. parallel) positions, and the link 154 twists. The link thereby acts as a torsional spring to resist rolling motion by the tractor.

The link's ability to twist is due to its construction. As shown in FIG. 2, link 154 is formed as two parallel plates of steel 156,158 that are spaced apart by spacers 160. Bolts 159 (FIG. 2) are inserted into holes in the ends of the plates and the spacers. These bolts are inserted into threaded holes in the suspension arms 104, 106 and tightened. Bolts 159 are located on each end of link 154 to secure left and right ends of link 154 to the left and right suspension arms, respectively.

Swing arms 104, 106 pivot about pin 126 with respect to the chassis of the tractor. As they pivot, they also flex with respect to the chassis of the tractor. To provide a substantially up-and-down movement, the pivot point defined by pin 126 must be extended substantially ahead of the axles 124. This distance, unfortunately, requires that the swing arms extend several feet backward from the pivot point defined by pin 126. As a result, when large loads are placed on the tractor's wheels, the swing arms tend to flex laterally inward toward the center line of the vehicle or laterally outward away from the centerline in a direction generally parallel to the longitudinal axis of the axles 124.

Figure 5:
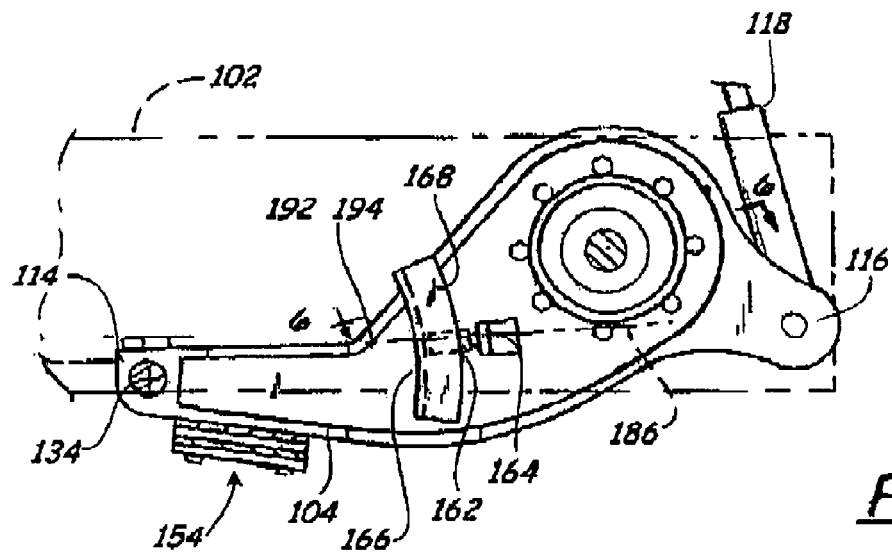
FIG. 5 is a left side view of the right side swing arm showing the inside (the left side) of the right side swing arm of FIGS. 1-4, the right side swing arm guide roller, and the right side swing arm roller track.
Figure 6:
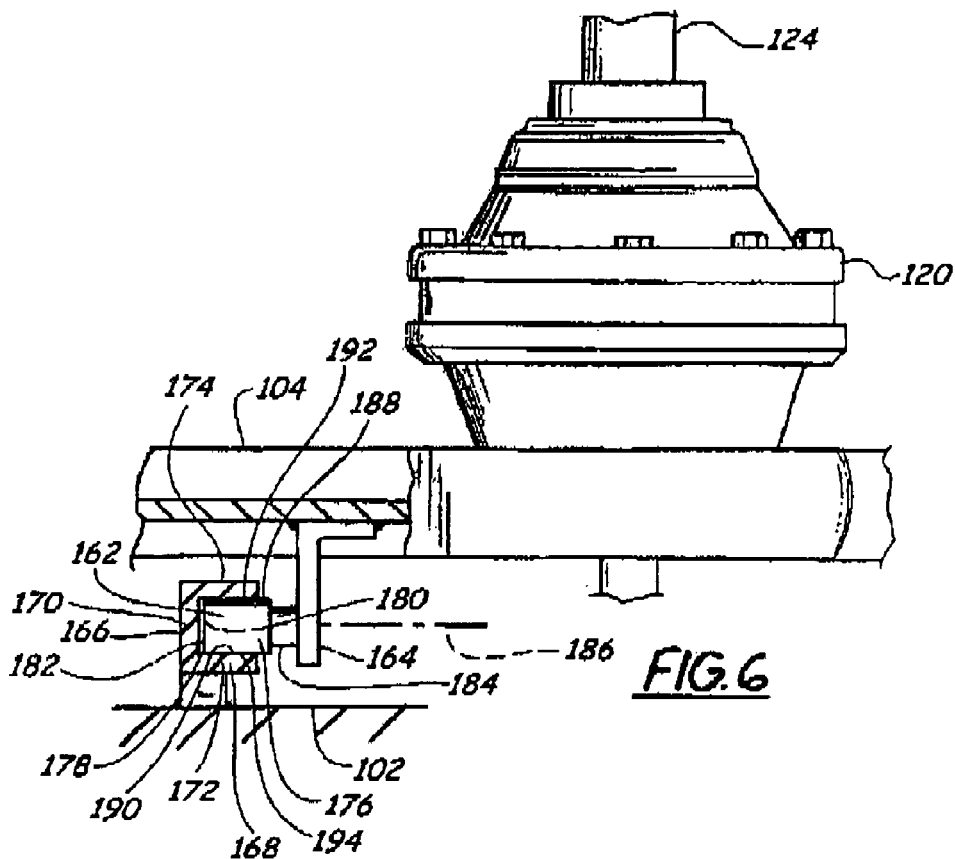
FIG. 6 is a fragmentary cross-sectional top view of the right side swing arm of FIGS. 1-5 taken at section line 6-6 in FIG. 5.

These flexing forces put considerable stress on the forward ends 114 of the suspension arms and the eyes 132 and pin 126 to which the forward ends are coupled. To reduce this stress, guide rollers 162 are provided that are supported on struts 164 fixed to the inside surface of the swing arms. Both the swing arms have such a roller and strut arrangement. Both roller and strut arrangements are mirror images of each other. In FIG. 3, for example, the roller and strut fixed to swing arm 106 is shown. In FIGS. 5-6, an identical roller and strut arrangement is shown extending from the inside surface of the left side control arm 104.

The way the guide rollers and guide tracks reduce stress is by transferring lateral stress—stress generally parallel to the longitudinal axis of axles 124—from suspension arms 104, 106 to the chassis of the tractor. At the same time, the guide rollers 162 and guide tracks 166 permit the suspension arm to pivot up-and-down about pin 126 without restraint. Any stress that tends to pull the rear 116 of the suspension arm laterally outward away from the chassis of the vehicle or push the rear 116 of the suspension arm laterally inward towards the chassis of the vehicle is communicated through the guide rollers 162 and tracks 166 to the chassis 102 of the tractor 100.

Referring now to FIGS. 5-6, we can see in more detail the guide track 166 that is fixed to the chassis of the tractor to support guide roller 164. The guide track 166 includes an elongate beam 168 having a web 170 and two flanges 172, 174 disposed on opposing sides of a roller wheel 176 of guide roller 162. The web 170 holds the two flanges 172, 174 in close proximity to one another and to opposing sides of roller wheel 176.

Flanges 172, 174 are spaced a constant distance apart to define therebetween a path for roller wheel 176 that provides only a slight clearance between the roller wheel and the flanges. The slight clearance permits the roller wheel to abut one flange and roll with that flange, or abut the other flange and roll with that flange depending upon the direction of the stresses applied to the suspension arm. If the stresses applied to the suspension arm press the rear end of the suspension arm inward toward the chassis of the vehicle, then roller wheel 176 engages the inner flange 172 of guide track. If the stresses applied to the suspension arm pull the rear end of the suspension arm outward away from the chassis of the vehicle, then roller wheel 176 engages the outer flange 174. The slight clearance is sufficient to permit the roller to engage either inner flange 172 or outer flange 174, without engaging both at the same time.

Web 170 of guide track 166 is preferably arcuate, having a radius of curvature equal to the distance from pin 126 to the web. As suspension arm 104 pivots up-and-down about the laterally extending axis defined by pin 126, roller wheel 176 follows an identical arcuate path, spaced slightly away from web 170.

A gap 178 is provided between the forward end of roller wheel 176 and the rear facing arcuate surface 180 of web 170. This gap is provided as a channel for receiving lubricant, and also to ensure that there is a clearance between the end face 182 of roller wheel 176 and surface 180 of web 170. Since roller wheel 176 rotates as it travels between flanges 172, 174, any contact with surface 180 of web 170 would cause unnecessary wear. The curvature of web 170 is such that gap 178 has a generally constant width over the entire range of travel of suspension arm 104.

Roller wheel 176 is supported for rotation on shaft 184, which is fixed to strut 164. The rotational axis 186 of roller wheel 176 with respect to suspension arm 104 extends generally fore-and-aft with respect to the chassis of the tractor and the suspension arm on which it is coupled. The rotational axis 186 also intersects the pivotal axis 134 about which the suspension arms pivot with respect to the chassis of the tractor. It is disposed both to the rear of and slightly above pin 126 and rotational axis 134. Roller wheel 176 is a right circular cylinder.

Flanges 172, 174 of guide track 166 have inwardly facing parallel bearing surfaces 188, 190 on which the surface of roller 176 is configured to roll. Both of these surfaces are planar, parallel, and extend generally vertically and fore-and-aft, perpendicular to the rotational axes of axles 124. The flanges abut roller wheel 176 along parallel lines of contact 192, 194. These lines of contact intersect the pivotal axis 134 about which suspension arm 104 pivots with respect to the chassis of the tractor.

In the arrangement of FIGS. 5-6, the guide rollers 164 and guide track 166 are disposed fore-and-aft between axle 124 on which the wheel is mounted and pin 126 about which the suspension arm 104 pivot with respect to the chassis. Further, the guide roller is fixed to the suspension arm and the guide track is fixed to the chassis of the tractor. Even further, the roller wheel 176 of the guide roller 162 is a right circular cylinder disposed between and configured to abut and roll on two flat, parallel, and planar surfaces 188, 190. Other arrangements may alternatively be used, however, such as the arrangement shown in FIGS. 7-8.

Figure 7:
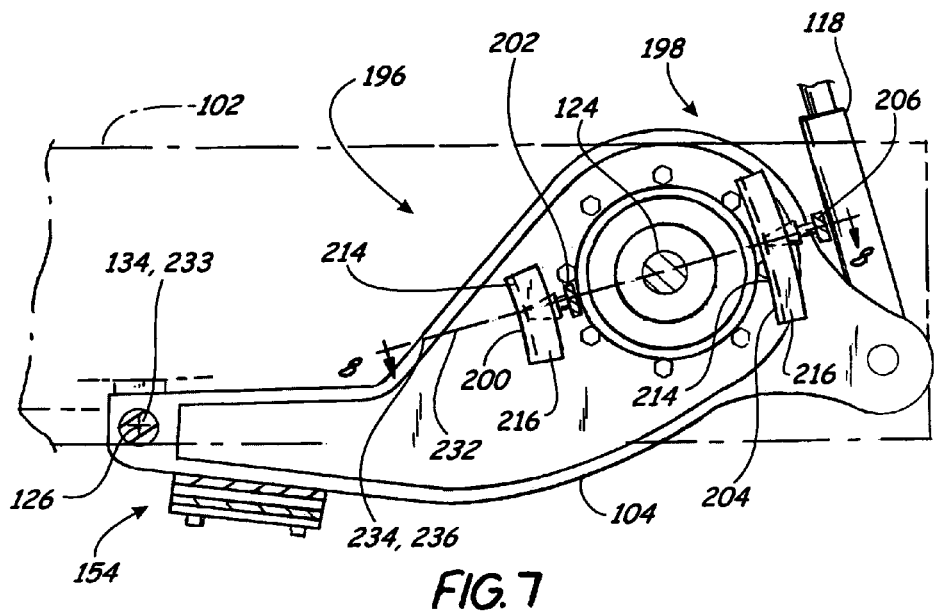
FIG. 7 is a left side view of an alternative arrangement of guide rollers and guide tracks showing the inside (the left side) of the right side swing arm, a pair of alternative right side swing arm guide rollers and a pair of alternative right side swing arm roller tracks.
Figure 8:
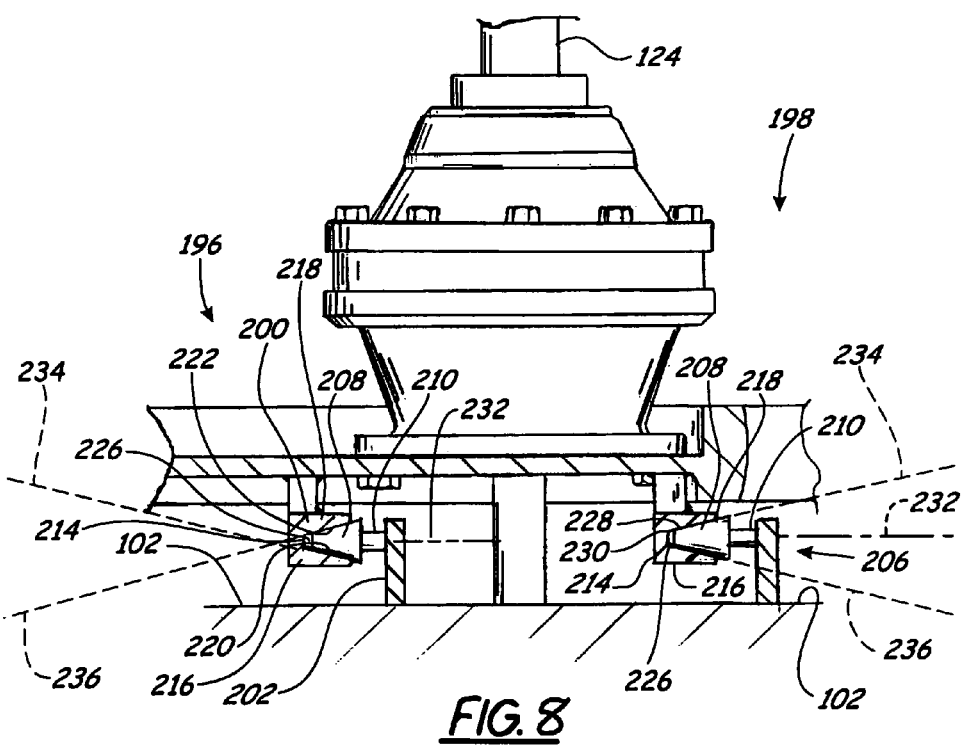
FIG. 8 is a fragmentary cross-sectional view of the alternative right side swing arm of FIG. 7 taken at section line 8-8 in FIG. 7.
Figure 9:
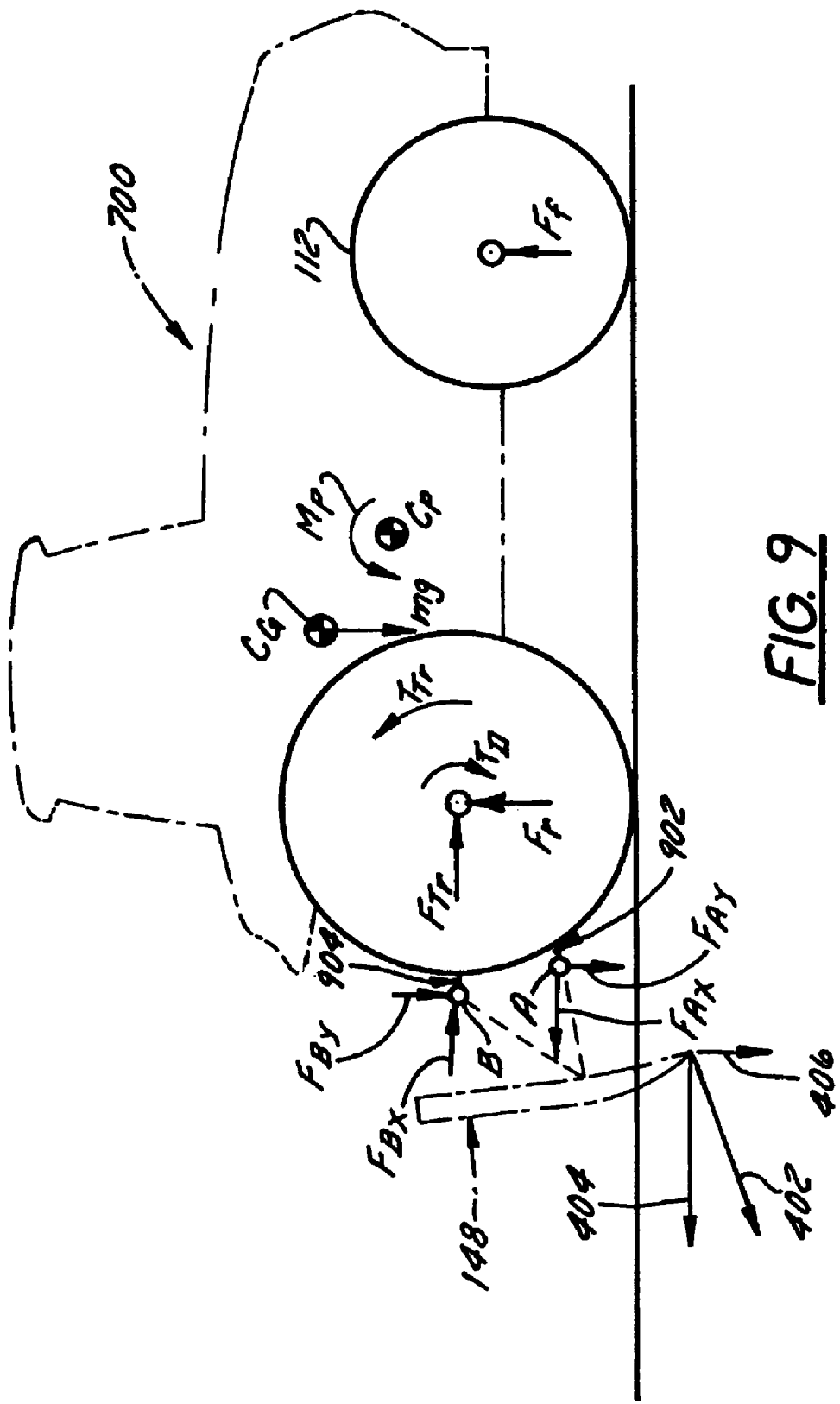
FIG. 9 is a force diagram of the tractor of the foregoing FIGURES showing the forces applied by the tractor to the ground and the reaction forces applied to the tractor.

In the arrangement of FIGS. 7-8, two alternative guide roller/guide track combinations are shown coupled to the identical tractor in place of the guide roller/guide track arrangement of FIGS. 5-6. The only things that differ between the FIGS. 5-6 tractor embodiment and the FIG. 7-8 tractor embodiment is the construction and arrangement of the guide roller/guide track combinations. In all other respects the tractor 100 is identical.

In the arrangement of FIGS. 7-8, each suspension arm 104, 106 is coupled to two guide roller/guide track combinations or assemblies. A first guide roller/guide track combination 196 is disposed between the axle 124 and axis 134 about which the suspension arms 104, 106 pivot with respect to the chassis of the tractor. A second guide roller/guide track combination 198 is disposed on the opposite side of axle 124 the first guide roller/guide track combination 196, on the after side of axle 124 that is disposed away from axis 134, such that axle 124 is disposed between axis 134 and guide roller/guide track combination 198.

Combination 196 includes a guide track 200 that is fixed to suspension arm 104 and a guide roller 202 that is fixed to the chassis 102 of the tractor.

Combination 198 includes a guide track 204 that is fixed to suspension arm 104 and a guide roller 206 that is fixed to the chassis 102 of the tractor.

Guide rollers 202 and 206 include a roller wheel 208 that is mounted on a shaft 210 for rotation thereon. Shaft 210 is fixed to a strut 212, that in turn is fixed to and extends from the chassis of the tractor.

Guide tracks 200, 204 include a web 214 and two flanges 216, 218 that are coupled to web 214.

Roller wheel 208 is shaped like the frustum of a cone and is disposed between two spaced apart inner surfaces 220, 222 of flanges 216, 218, respectively. Roller wheel 208 has a rotational axis 224 that intersects axis 134.

Flanges 216, 218 are spaced a variable distance apart to define therebetween a path for roller wheel 208 that provides only a slight clearance between the roller wheel and the flanges. The slight clearance permits the roller wheel to abut one flange and roll with that flange, or abut the other flange and roll with that flange depending upon the direction of the stresses applied to the suspension arm. If the stresses applied to the suspension arm press the rear end of the suspension arm inward toward the chassis of the vehicle, then roller wheel 208 engages surface 220 of inner flange 216 of the guide track. If the stresses applied to the suspension arm pull the rear end of the suspension arm outward away from the chassis of the vehicle, then roller wheel 208 engages surface 222 of outer flange 218. The slight clearance is sufficient to permit roller wheel 208 to engage either inner flange 216 or outer flange 218, without engaging both at the same time.

Web 214 of guide tracks 200, 204 is preferably arcuate, having a radius of curvature equal to the distance from pin 126 to the web. As suspension arm 104 pivots up-and-down about the laterally extending axis defined by pin 126, roller wheel 208 follows an identical arcuate path, spaced slightly away from web 214.

A gap 226 is provided between the forward end of roller wheel 208 and the rear facing arcuate surface 228 of web 214. This gap is provided as a channel for receiving lubricant, and also to ensure that there is a clearance between the end face 230 of roller wheel 208 and surface 228 of web 214. Since roller wheel 208 rotates as it travels between flanges 216, 218, any contact with surface 228 of web 214 would cause unnecessary wear. The curvature of web 228 is such that gap 226 has a generally constant width over the entire range of travel of suspension arm 104.

Roller wheel 208 is supported for rotation on shaft 210, which is fixed to strut 212. The rotational axis 232 of roller wheel 208 extends generally fore-and-aft with respect to the chassis of the tractor to which it is fixed for rotation. The rotational axis 232 also intersects the pivotal axis 134 about which the suspension arms pivot with respect to the chassis of the tractor. It is disposed both to the rear of and slightly above pin 126 and rotational axis 134.

Flanges 216, 218 of guide tracks 200, 204 have inwardly facing bearing surfaces 220, 222 on which the surface of roller 208 is configured to roll. Both of these surfaces are arcuate, and each defines a portion of a frustum of a cone. The axis of the frustum is parallel and coaxial with axis 134, and is parallel to and spaced away from the rotational axes of axles 124. Flanges 216, 218 abut roller wheel 208 along intersecting lines of contact 234, 236. These lines of contact intersect each other and intersect the pivotal axis 134 about which suspension arm 104 pivots with respect to the chassis of the tractor.

In FIGS. 5-8, only the right hand side guide roller/guide track combinations are disclosed. There is an identical mirror image guide roller/guide track combination on the left side of the vehicle. The left-hand side of the vehicle is arranged identically to the right hand side of the vehicle but in mirror relation, mirrored about a plane that extends vertically and also longitudinally down the center line of the vehicle. All the relations between the right side suspension arm 104 and its respective guide rollers and guide tracks are identical to the relationship between the guide rollers and guide track of the left side of the vehicle and the left side suspension arm 106.

Figure 4:
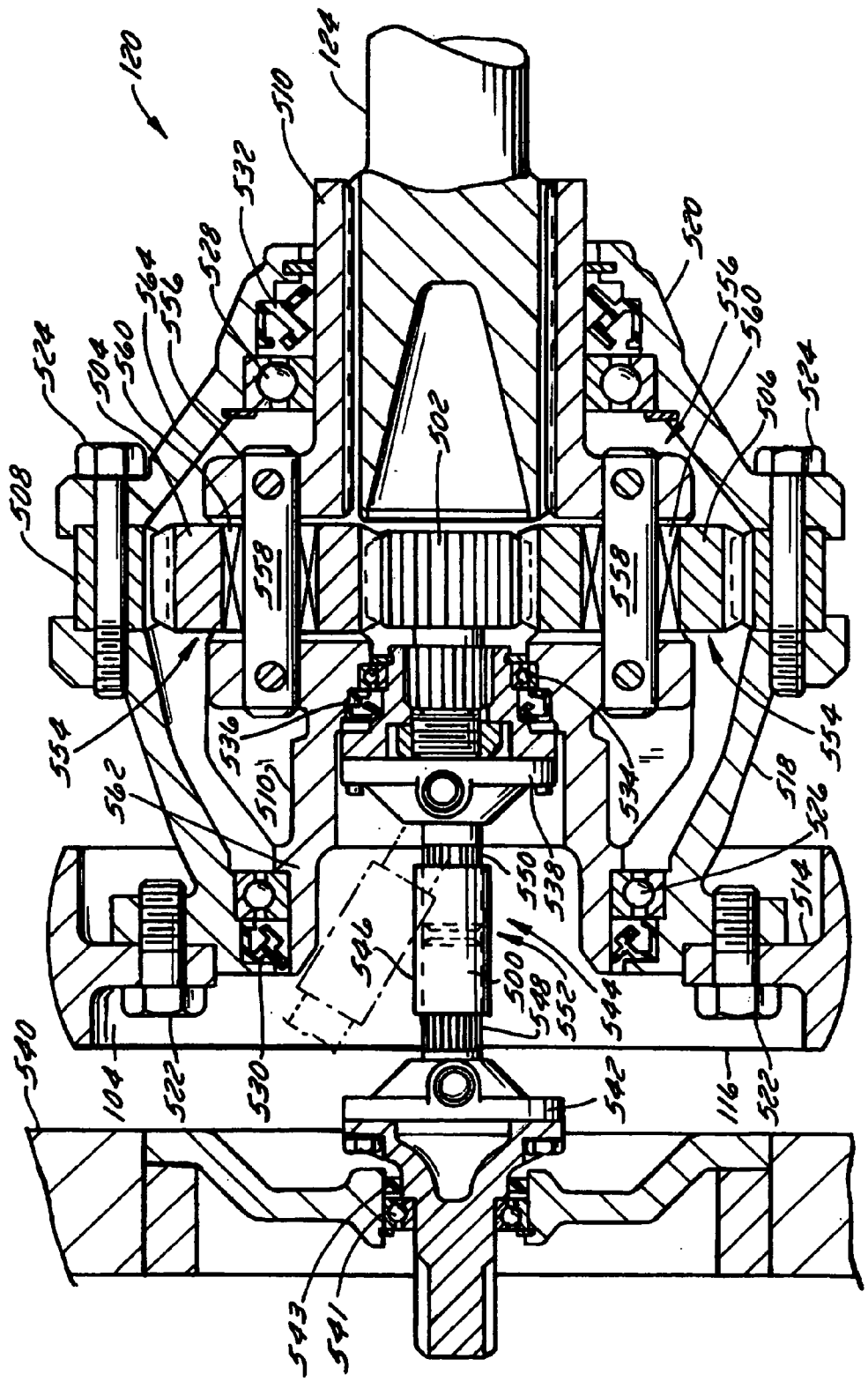
FIG. 4 is a partial cutaway rear view of the right side planetary gear system taken at section line 5-5 in FIG. 2.

FIG. 4 illustrates a preferred planetary gear arrangement of the suspension arms 104, 106 of FIGS. 1-3. FIG. 4 is a cross section through the planetary gear system 120 of the right side suspension arm. It is taken at section line 5-5 of FIG. 2. The cutting plane that defines section 5-5 passes through the centerline of right side axle 124 to which the right wheel is mounted.

The discussion below relates to the right side planetary gear system. The left side planetary gear system is identically disposed and configured as the right side planetary gear system, but in mirror image form and on the opposite side of the vehicle on the left side suspension arm. Since the two are identical in construction and operation, we do not separately discuss the left side planetary gear system.

As shown in FIG. 4, planetary gear system 120 includes a drive shaft 500 that is coupled to a sun gear 502. The tractor engine, typically through a drive shaft connected to the engine's crankshaft and a set of differential gears, drives sun gear 502, which drives three planetary gears that engage a ring gear 508 (only two planetary gears 504, 506 are shown in FIG. 4).

In the embodiment of FIG. 4 the sun gear preferably has 15 teeth and the ring gear preferably has 73 teeth, although one of ordinary skill will appreciate that any number of teeth may be used without departing from the scope of the invention. The planetary gears drive planetary gear carrier 510, which is coupled to and drives right side axle 124.

The gear system according to the embodiment shown in FIG. 4 comprises two casings 518 and 520. Casing 518 is bolted to outer wall 514 of suspension arm 104 by bolts 522. Casing 520 is bolted to casing 518 by bolts 524. Ring gear 508 is fixed between the two casings 518, 520 and is fixed to the two casings to make a rigid casing when bolts 524 are tightened.

Casings 518, 520 support two bearings 526 and 528, respectively, on their inner surfaces. These two bearings 526, 528 support the planetary gear carrier 510. Bearings 526 and 528 support the entire weight of the right rear side of the vehicle. Since the wheels may be mounted on axle 124 at some distance from bearings 526, 528, there may be a considerable overhanging load acting on these bearings. For this reason, they are preferably spaced apart a distance of several hundred millimeters, preferably at least 460 mm. The spacing of the bearings may be increased or decreased in application as is necessary; but one of ordinary skill will appreciate that greater bearing spacing—as is achieved in the preferred embodiment of this invention—is preferred because it withstands the overhanging load better than relatively narrow spacing.

Casings 518 and 520 also support two seals 530 and 532 that are disposed to seal against the inner and outer ends, respectively, of planetary gear carrier 510. These seals keep gear lubricant inside gear housing 516 and ensure that the gears are bathed in lubricant.

Axle 124 is force fit to planetary gear carrier 510 to collectively form a rigid rotating member that is disposed inside housing 516. As will be described in detail below, the planetary gear carrier 510 is in the form of a hollow cylinder that is configured to receive and support the sun gear for rotation in the inboard end of the carrier 510 and to receive (and be fixed to) the axle 124 in the outboard end of the carrier 510.

The sun gear 502 is supported inside the inboard hollow end of the gear carrier 510 on bearing 534. Bearing 534 permits free rotation of the sun gear 502 with respect to gear carrier 510. A seal 536 is fixed on the outboard side of the bearing 534 to ensure that gear lubricant does not leak out of housing 516 between the sun gear shaft and the inner surface of gear carrier 510.

Drive shaft 500 includes a first flexible coupling 538 (e.g. a universal joint or constant velocity joint) that is coupled to and drives sun gear 502. Coupling 538 permits the suspension arm 104 to pivot, or travel, up and down with respect to the differential housing 540.

The left end (in the FIGURE) of drive shaft 500 is supported for rotation in differential housing 540 by bearing 541, which permits the end of the drive shaft to rotate with respect to the differential housing. A seal 543 seals against drive shaft 500 and differential housing 540 to prevent differential-housing lubricant from leaking out of the differential housing. The differential gears to which the left end of drive shaft 500 is coupled have been removed for clarity of illustration in this FIGURE.

Drive shaft 500 includes a second flexible coupling 542. Coupling 542 also permits the suspension arm 104 to pivot up and down with respect to differential housing 540.

Drive shaft 500 includes a central shaft portion 544 that is disposed between and couples both flexible couplings. This central portion includes a sleeve 546 with a splined inner surface. Sleeve 546 slides over and couples the splined outer surfaces of two stub shafts 548 and 550. A small space 552 is provided between the ends of shaft portions 548 and 550 to ensure that the two shaft portions never abut in any operating position of suspension arm 104 with respect to differential housing 540.

Gear carrier 510 may be formed as a single cylindrical casting including a flared central portion, which includes machined bearing mounts and three machined slots 554 (two shown in FIG. 4) to receive the three planetary gears. Through holes 556 are machined in the carrier 510 to receive planetary gear axles 558. Bearings 560 are disposed between the planetary gears and their respective axles to support the planetary gears for rotation on their axles.

In an alternative arrangement, however, gear carrier 510 is formed from two castings, rather than a single casting. A flanged, inner cylindrical portion 562 and a flanged, outer cylindrical portion 564 of planetary gear system 120 may be separately cast and subsequently bolted together with their flanged ends facing each other.

It should be noted that FIG. 4 shows two planetary gears 504, 506 that are spaced apart by 180 degrees about drive shaft 500. All three planetary gears are actually disposed at 120 degrees with respect to one another about the longitudinal axis of the planetary gear system 120. It is for ease of illustration, understanding, and explanation that only two planetary gears are shown in FIG. 4 and that they are shown spaced 180 degrees apart.

The two casings 518, 520 are preferably generally conical. Casing 518 is preferably in the form of a conical section with its vertex pointing inward toward the differential housing and casing 520 is preferably in the form of a conical section with its vertex pointing away from the differential housing. This conical configuration provides a flaring inner surface on both casings that makes it easy to mount the seals and the bearings.

From the foregoing detailed description of the preferred embodiments, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

For example, any of the roller wheels depicted herein can be fixed to either a suspension arm or the chassis of the vehicle. In the case of the two guide wheel/guide track arrangement of FIGS. 7 and 8, one roller wheel can be fixed to the chassis and one fixed to the suspension arm. Similarly, one of the mating guide tracks can be fixed to the suspension arm and the other fixed to the chassis. Alternatively, both guide rollers can be fixed to the suspension arm and both guide tracks fixed to the chassis.

I claim:

1. A tractor, comprising:
   a chassis comprising a front end, a rear end, a left side and a right side;
   a pair of steerable front wheels coupled to the front end, left and right side of the chassis;
   a left side rear wheel suspension including a left rear suspension arm pivotally coupled to the chassis at a left arm pivot point at a forward end of the left rear suspension arm;
   a right side rear wheel suspension including a right rear suspension arm pivotally coupled to the chassis at a right arm pivot point at a forward end of the right rear suspension arm;
   a first guide roller and an interengaged first guide track coupled to and between the left rear suspension arm and the chassis; and
   a second guide roller and an interengaged second guide track coupled to and between the right rear suspension arm and the chassis.

2. The tractor of claim 1, wherein left rear suspension arm and the right rear suspension arm pivot with respect to the chassis about a first arm axis that extends laterally with respect to the chassis, and further wherein the first guide roller rotates about a first roller rotary axis that is normal to and intersects the first arm axis, and further wherein the wherein the second guide roller rotates about a second roller rotary axis that is normal to and intersects the first arm axis.

3. The tractor of claim 2, wherein the first guide roller is disposed between a left side drive axle that extends from the rear of the right suspension arm and the left arm pivot point, to permit pivotal movement of the left arm about the left arm pivot point and to reduce flexure of the left arm in a direction parallel to the first arm axis, and further wherein the second guide roller is disposed between a right side drive axle that extends from the rear of the right suspension arm and the right arm pivot point to permit pivotal movement of the right arm about the right arm pivot point, and to reduce flexure of the right arm in a direction parallel to the first arm axis.

4. The tractor of claim 1, wherein the first and second guide rollers are fixed to opposite sides of the chassis of the vehicle and the first and second guide tracks are fixed to the left and right suspension arms, respectively.

5. The tractor of claim 1, wherein the first and second guide tracks each comprise an arcuate c-shaped beam having an internal roller channel with two opposed inner side walls that are disposed to guide the first and second guide rollers therebetween.

6. The tractor of claim 5, wherein the first and second guide rollers are right circular cylinders and the first and second guide tracks define in cross-section a rectangular channel with one open side.

7. A tractor, comprising:
   a chassis with a front end, a rear end, a left side, and a right side, the chassis comprising an elongate rigid memher, the member futher comprising an engine, a transmission and rear differential;
   a pair of steerable front wheels coupled to the front end, left and right side of the chassis;
   two rear wheel suspensions fixed to left and right sides of the rear of thee chassis, each suspension further comprising:
      a rear suspension arm having a front end and a rear end, wherein the arm is pivotally coupled to the rear of the chassis at a rear arm pivot point located at the front end of the rear suspension arm;
      a first guide track coupled to one of the tractor chassis and the rear suspension arm; and
      a first guide roller coupled to another of the tractor chassis and the rear suspension arm,
   wherein the first guide roller is supported within the first guide track for rotation and is disposed to prevent both lateral inward flexure and lateral outward flexure of the rear suspension arm.

8. The tractor of claim 7, wherein rear suspension arm pivots with respect to the chassis about a first arm axis that extends laterally with respect to the chassis, and further wherein the first guide roller rotates about a first roller rotary axis that is normal to and intersects the rear suspension arm axis.

9. The tractor of claim 8, wherein the first guide roller is disposed between a drive axle that extends from the rear of the rear suspension arm and the rear arm pivot point, to permit pivotal movemeot of the rear arm about the rear arm pivot point and to reduce flexure of the rear arm in a direction parallel to a rotational axis of the drive axle.

10. The tractor of claim 7, wherein the first guide roller is fixed to the chassis of the vehicle and the first guide track is fixed to the rear suspension arm.

11. The tractor of claim 7, wherein the first guide track comprises an arcuate c-shaped beam having an internal roller channel including two opposed inner side walls that are disposed to guide the first guide roller therebetween.

12. The tractor of claim 11, wherein the first guide roller is a right circular cylinder and the first guide track is a rectangular channel with one open side.

13. The tractor of claim 7, wherein each suspension further comprises:
   a planetary gearbox fixed to the rear arm;
   a drive axle extending from the gearbox;
   a second guide track coupled to one of the tractor chassis and the rear suspension arm; and
   a second guide roller coupled to another of the tractor chassis and the rear suspension arm, wherein the second guide roller is supported within the second guide track for rotation to prevent both lateral inward flexure and lateral outward flexure of the rear suspension arm.

14. The tractor of claim 13, wherein the first gidde roller and first guide track are disposed in front of the axle an tire second guide roller and second guide track are disposed behind the axle.

15. A tractor, comprising:
a chassis comprising an elongate rigid member, the member comprising an engine, a transmission and a rear differential, the chassis having a front end and a rear end;
a pair of steerable front wheels coupled to the front end, left and right side of the chassis;
two rear suspensions pivotally coupled to opposite sides of the rear of the chassis to pivot with respect thereto, each suspension comprising:
   an elongated suspension arm having a front end and a rear end, wherein the front end is pivotally coupled to the chassis at a pivot point to pivot with respect to the chassis about a laterally extending pivotal axis;
   a planetary gearbox fixed to the suspension arm and having a drive axle extending laterally outward away from the chassis; and
   a guide assembly fixed to and between the suspension arm and the chassis to prevent lateral inward flexure and lateral outward flexure of the rear suspension arm and to permit the suspension arm to pivot about the pivotal axis with respect to the chassis,
wherein the pivotal axes of the two rear suspensions arc coaxial.

16. The tractor of claim 15, wherein the guide assembly includes at least one guide roller supported by at least one guide track for rolling contact thereon, arid wherein one of the guide roller and the guide track is fixed to the chassis and another of the guide roller and the guide track is fixed to the suspension arm.

17. The tractor of claim 16, wherein the guide roller has a rotational axis chat extends generally fore-and-aft with respect to the chassis.

18. The tractor of claim 17, wherein the guide roller rotational axis intersects the pivotal axis.

19. The tractor of claim 15, wherein the guide track comprises an arcuate c-shaped beam having an irternal roller channel defined by two facing tracks for the guide roller.

20. The tractor of claim 19, wherein the two facing tracks define two parallel planes or portions or two conic sections.

* * * * *